June 23, 1931.  H. C. LORD  1,810,972
CLEVIS
Filed Oct. 13, 1924

Inventor

Patented June 23, 1931

1,810,972

UNITED STATES PATENT OFFICE

HUGH C. LORD, OF ERIE, PENNSYLVANIA

CLEVIS

Application filed October 13, 1924. Serial No. 743,307.

The present invention is designed to improve clevises, particularly clevises which are to be used with joints such as rubber joints having joint members with one of which it is desired to lock the clevis although the clevis may be used with other types of joints. Features of the invention will appear from the specification and claims.

The invention is illustrated in the accompanying drawings as follows:—

Figure 1:
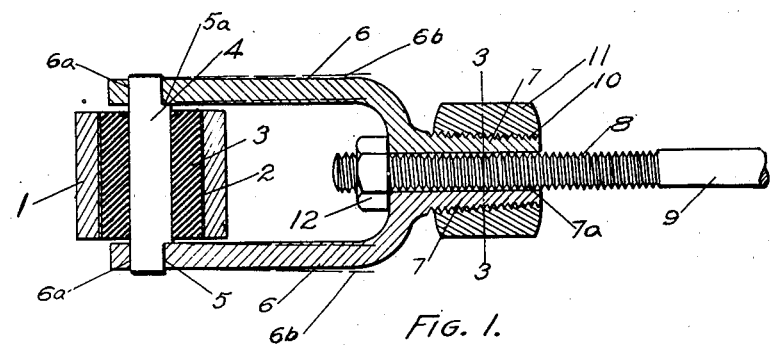
Fig. 1 shows a central section through the clevis.
Figure 2:
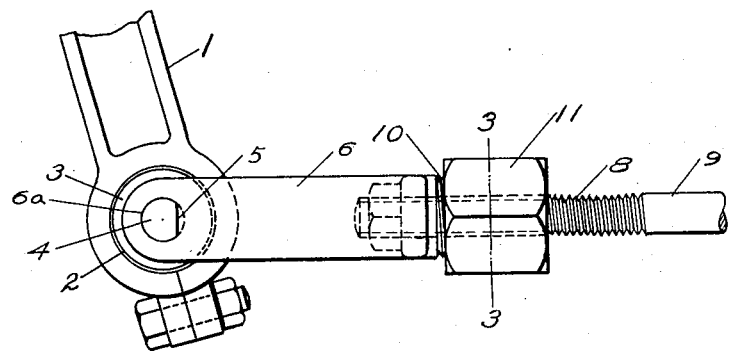
Fig. 2 is side elevation.
Figure 3:
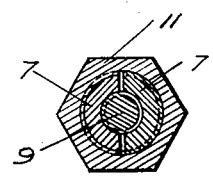

Fig. 3 a section through the line 3—3 in Figs. 1 and 2.

1 marks a lever, such as a brake lever, 2 an outer shell, ordinarily of steel, of a joint unit, 3 a rubber insert bonded to the rubber shell and 4 a central pin to which the rubber is also bonded, the shell 2 being fixed with the lever and the rubber taking the oscillating movement of the lever 1 through its distortion in the manner indicated in my Patent, #1,452,693, April 24, 1923.

The central pin 4 has flats 5 formed in its ends, these flats forming shoulders 5a at the inner ends of the flats. The clevis is made in two parts, each part having an arm 6 with an opening 6a corresponding in shape to the ends of the pin 4, the pin 4 being locked against turning with respect to the clevis by reason of the engagement of the flat with the wall of the opening 6a. The arms 6 have extensions 7. These extensions have the central opening 7a adapted to receive the screw-threaded end 8 of the rod 9. The exterior surface of the extension is tapered and provided with a screw thread 10. A nut 11 is screwed on to the tapered extension and as it is screwed up on the tapered portion clamps the walls of the extension against the rod 9. The rod 9 may be smooth, if desired, but if the screw thread is provided the clamping action is made more effective.

A nut 12 is screwed on to the inner end of the rod 9 and engages the rear end of the arms 6.

When it is desired to adjust the rod 9 the nut 11 is loosened and the rod drawn up by the nut 12. The nut 11 is again set in place, thus clamping the walls of the extension on the rod.

The arms 6 have an initial position before the nut 11 is screwed to place as indicated in dash lines 6b. As a result of this the arms are drawn together exerting a spring-pressed clamping pressure between the arms 6 and the shoulders 5a, thus assuring a tight joint between the ends of the arms and the pin. It will be noted that the axial movement is entirely sustained by the rubber of the joint and that there is sufficient clearance between the arms of the clevis and the outer member to prevent contact between the outer member and the clevis under normal axial stresses on the joint, one of the purposes of the structure being to avoid metallic contact between the parts.

What I claim as new is:—

1. In a clevis mechanism, the combination of a joint comprising an outer and inner joint member; a rubber bushing between said members, the contacting surfaces of the bushing and members being fixed relatively to each other and receiving oscillatory movement by distortion of the rubber; and a split clevis locked relatively with and contacting the inner joint member, the clevis having sufficient clearance relatively to the outer member to prevent contact under normal axial thrusts.

2. In a clevis mechanism, the combination of a joint comprising an outer and inner joint member; a rubber bushing between said members, the contacting surfaces of the bushing and members being fixed relatively to each other and receiving oscillatory movement by distortion of the rubber, the inner joint member having a shouldered flat thereon; and a clevis contacting the inner joint member and having one arm with an opening conforming to the end of the inner joint member having the shouldered flat, said arms having sufficient clearance relatively to the outer member to prevent contact therewith under normal axial thrusts on the joint.

3. In a clevis mechanism, the combination of a joint comprising an outer and inner joint member; a rubber bushing between said members, the contacting surfaces of the bushing and members being fixed relatively to each other and receiving oscillatory movement by distortion of the rubber, the inner joint member having shouldered flats at both ends thereof; and a clevis having openings conforming to the flats of the inner joint member and engaging the shoulders thereon.

4. In a clevis mechanism, the combination of a joint comprising an outer and inner joint member; a rubber bushing between said members, the contacting surfaces of the bushing and members being fixed relatively to each other and receiving oscillatory movement by distortion of the rubber, the inner joint member having shouldered flats at both ends thereof; a split clevis having openings receiving the shouldered ends of the inner joint member; and means uniting the parts of the clevis and exerting pressure on the arms of the clevis.

5. In a clevis mechanism, the combination of a joint comprising an outer and inner joint member; a rubber bushing between said members, the contacting surfaces of the bushing and members being fixed relatively to each other and receiving oscillatory movement by distortion of the rubber; a split clevis having arms locked with and contacting the inner member, said arms having extensions having an inner opening therethrough and screw-threaded outer surfaces; a rod in the opening; and a nut on the screw-threaded outer surfaces crowding the arms into engagement with the inner member and exerting clamping pressure on the rod.

6. In a clevis mechanism, the combination of a joint comprising an outer and inner joint member; a rubber bushing between and locked with said members receiving oscillatory movement by distortion of the rubber; a split clevis having a hollow extension and a tapered screw thread on the outer surface of said extension; a nut on said screw-thread; a rod extending through the extension; and a nut on the inner end of the rod.

7. In a clevis mechanism, the combination of a joint comprising an outer and an inner joint member; a rubber bushing between said members receiving the oscillatory movement by distortion of the rubber, the contacting surfaces of the bushing and members being fixed relatively to each other; and a clevis having its arms locked with the inner joint member, said arms exerting endwise pressure on the member and having sufficient clearance with relation to the outer member to prevent contacting the outer member under normal radial thrusts on the joint.

In testimony whereof I have hereunto set my hand.

HUGH C. LORD.